United States Patent [19]

Davis et al.

[11] 4,114,368
[45] Sep. 19, 1978

[54] SUPPORT FOR CONCENTRIC TURBINE BLADE SHROUD

[75] Inventors: Warren W. Davis, Dunlap; David E. Keedy, Pekin, both of Ill.

[73] Assignee: Caterpillar Tractor Co., Peoria, Ill.

[21] Appl. No.: 728,670

[22] Filed: Oct. 1, 1976

Related U.S. Application Data

[63] Continuation-in-part of Ser. No. 630,476, Nov. 10, 1975, Pat. No. 4,030,288.

[51] Int. Cl.² ............................................. F02C 7/20
[52] U.S. Cl. .............................. 60/39.16 R; 60/39.31; 415/189
[58] Field of Search .............. 60/39.16 R, 39.31, 39.5, 60/39.51 R, 415/136, 137, 189, 190

[56] References Cited

U.S. PATENT DOCUMENTS

| | | | |
|---|---|---|---|
| 2,587,057 | 2/1952 | McVeigh | 60/39.32 |
| 2,960,306 | 11/1960 | Collman et al. | 60/39.16 R |
| 3,077,074 | 2/1963 | Collman et al. | 60/39.16 R |
| 3,842,595 | 10/1974 | Smith et al. | 415/189 |
| 3,902,314 | 9/1975 | Straniti | 60/39.31 |

*Primary Examiner*—Carlton R. Croyle
*Assistant Examiner*—L. J. Casaregola
*Attorney, Agent, or Firm*—Phillips, Moore, Weissenberger, Lempio & Majestic

[57] ABSTRACT

The invention is concerned with an improved turbine shroud support assembly useful in a gas turbine engine which comprises a gasifier module within a case, a power output module fixedly detachably attachable to the case in position to receive exhaust gases exiting a combustor and passing via a gasifier turbine portion of said gasifier module to drive a power turbine having a turbine shroud about a plurality of blades thereof and thereby drive a shaft of said power output module and a heat exchanger arranged to receive compressed gas from a compressor of said gasifier module, heat the compressed gas therein and pass the resulting heated gas to the combustor and to receive the exhaust gases from the power turbine, cool the exhaust gases therein by transferring some of the heat thereof to the compressed gas and pass the resulting cooled exhaust gases to the exterior of the heat exchanger. The improved shroud support assembly comprises a plurality of struts supported by the power output module in fixed relation to the power turbine shaft and radially extending outwardly adjacent the power turbine, the struts supporting at an outer end thereof the turbine shroud in fixed closely spaced concentric relation about the plurality of turbine blades, the struts supporting at the outer end thereof an outer shroud which is positioned to direct flow of the exhaust gases from the blades of the power turbine to the heat exchanger.

7 Claims, 6 Drawing Figures

SUPPORT FOR CONCENTRIC TURBINE BLADE SHROUD

CROSS-REFERENCE

This application is a continuation-in-part of co-pending application Ser. No. 630,476 filed Nov. 10, 1975, (U.S. Pat. No. 4,030,288) and commonly assigned herewith.

BACKGROUND OF THE INVENTION

1. Field of the Invention

The invention relates to the art of gas turbine engines and more particularly to the art of modular gas turbine engines. Still more particularly, the invention is concerned with an improved shroud support assembly useful with a modular gas turbine engine assembly from which a power output module is disassembleable for easy servicing. Still more particularly the invention is particularly concerned with an improved turbine shroud support assembly for such a modular gas turbine engine wherein concentricity is provided between the turbine blades and the shroud. The particular assembly of the invention also allows for interchangeability of turbine shrouds without removal of the turbine rotor and blades. A very close tip clearance between the turbine shroud and the tips of the turbine blades is a part of the invention, which tip clearance is not in any way dependent upon the preciseness of alignment of the power output module when fastened to the rest of the modular turbine engine.

2. Prior Art

A number of modular gas turbine engines are known. For example, Solar produces some such engine in the form of vertically removable modules as described for example in Gas Turbine International of March-April 1972 on page 3 thereof. This type of modular gas turbine engine assembly requires that the individual sections or modules thereof be removed vertically and futher requires that the shafts between modules be themselves disassembleable one from another so as to be vertically removable in sections with the rest of the modules thereof. Such modular gas turbine engine assemblies have a tendency to be relatively large for the horsepower available. Avco Lycoming produces a "TS" series of modular gas turbine engines as discussed for example in Gas Turbine World, dated March 1974 on page 27. Dresser Industries, as described in Sawyer's Gas Turbine catalog for 1970 at page 179 discloses yet other modular gas turbine engine assemblies. Yet another modular gas turbine engine is described in U.S. Pat. No. 3,842,595. A pressure seal for separating elements of a gas turbine engine shroud assembly is disclosed in detail in U.S. Pat. No. 3,869,222. U.S. Pat. No. 3,169,749 is concerned with expansion devices in the form of axially spaced cylindrical bellows for turbine casings. U.S. Pat. No. 3,759,323 discloses a heat exchanger which is useful with a gas turbine engine and is attachable thereto.

Co-pending application Ser. No. 630,476 filed Nov. 10, 1975, commonly assigned herewith, discloses a particularly useful and unique modular gas turbine engine assembly having as a first module a tubular case. As a second module the assembly includes a gasifier module having a first tubular housing fixedly detachably attachable with a first end thereof adjacent a first end of the case with the axis of the first housing aligned generally with the axis of the case, a compressor generally within a second end of the first housing, a combustor generally extending outwardly from the first end of the first housing, and a first integral shaft extending from the compressor to adjacent the combustor. The aforementioned co-pending patent application also discloses a gasifier module which is provided outwardly radially from the first shaft and having first blades positioned to be in the path of the exhaust gases exiting the combustor to drive the first shaft and thereby drive the compressor. The third module is a power output module having a second tubular housing fixedly detachably attachable with a first end thereof adjacent a second end of the case with the axis of the second housing aligned generally with the axis of the case, a power turbine generally extending outwardly from the first end of the second housing having second blades positioned to be in the path of the exhaust gases exiting the gasifier turbine, output gear means and a second shaft driven by the powerr turbine and driving the output gear means. First and second means are provided each extending inwardly within the case, the first means extending towards the combustor and the second means extending towards the power turbine. First slidable sealing means are provided for sealably adjustably sealing the gasifier module adjacent the combustor to the first extending means. Second slidable sealing means are provided for sealing the power output module adjacent the power turbine to the second extending means.

The present invention is concerned with a unique and improved shroud support assembly which is particularly useful with the invention disclosed in out co-pending application Ser. No. 630,476 but is also useful in other gas turbine engines having a removable power output module.

SUMMARY OF THE INVENTION

The invention is concerned with an improved turbine shroud support assembly useful in a gas turbine engine which comprises a gasifier module in a case, a power output module fixedly attachable to the case in position to receive exhaust gases exiting a combustor and passing via a gasifier turbine portion of said gasifier module to drive a power turbine having a turbine shroud about a plurality of blades thereof and thereby to drive a shaft of said power output module. The improved turbine shroud support assembly comprises a plurality of struts radially extending outwardly adjacent the power turbine, the struts supporting at an outer end thereof the turbine shroud in fixed closely spaced concentric relation about the plurality of turbine blades, the struts further supporting at the outer ends thereof an outer shroud which is positioned to direct flow of the exhaust gases away from the blades of the power turbine; a stationary bearing carrier surrounding and supporting an outer race of a bearing, an inner race of said bearing contacting said power turbine shaft; inner support means fixed to said bearing carrier; a plurality of sleeves, each having an axis generally radially extending from said shaft supported by said inner support means, said inner ends of each of said struts fitting in tight but slidable relation within a respective one of said sleeves, said turbine shroud including a plurality of holes therethrough in one-to-one relation with said plurality of struts, each of said struts fitting in a respective one of said holes in tight but slidable relation; and a plurality of fastening means in one-to-one relation with said plurality of struts, each of said fastening means fastening said turbine shroud to a respective one of said struts, each of said struts being movable radially inwardly toward said shaft and out of the respective holes when the respective fastening means is detached to allow removal of said turbine shroud without removal of a turbine rotor which supports said blades and is driven by said shaft—.

It is an object of the present invention to provide a turbine shroud which is removable from about the turbine rotor and blades while the turbine rotor and blades remain attached to the turbine shaft.

It is another object of the present invention to provide a turbine shroud concentric about the turbine blades with minimal clearance between the tips of the turbine blades and the turbine shroud.

It is a further object still of the invention to provide a support structure for a turbine shroud and for an outer shroud positioned to direct flow of exhaust gases from the blades of the power turbine to a heat exchanger which support structure is retractable radially inwardly to allow removal of one or both of said turbine shroud and said outer shroud.

It is a further object yet of the invention to provide a support structure supported by a power output module of a gas turbine engine wherein the power output module is detachably attachable to the engine and whereby the concentricity of the turbine shroud about the tips of the turbine blades is not affected by the relative alignment of the power output module and the remainder of the gas turbine engine.

These and other objects of the invention as will become apparent from reading the following description are accomplished as set out herein.

BRIEF DESCRIPTION OF THE DRAWINGS

The invention will be better understood by reference to the figures of the drawings wherein like numbers denote like parts throughout and wherein.

DETAILED DESCRIPTION OF THE PREFERRED EMBODIMENT

Figure 1:
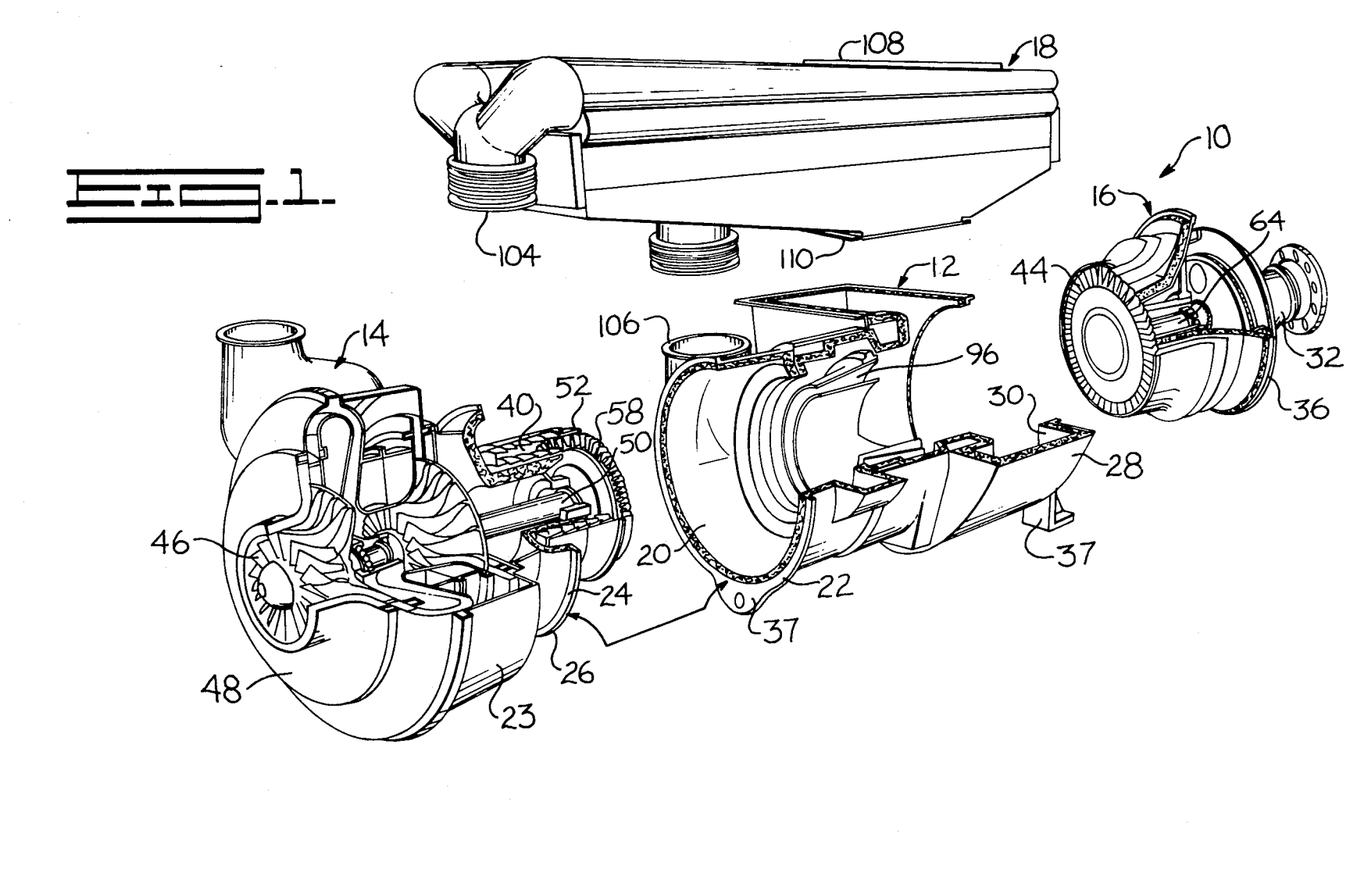
FIG. 1 illustrates in exploded partially cut away isometric view of a modular gas turbine engine assembly which may advantageously use the turbine shroud support assembly of the present invention.
Figure 2:
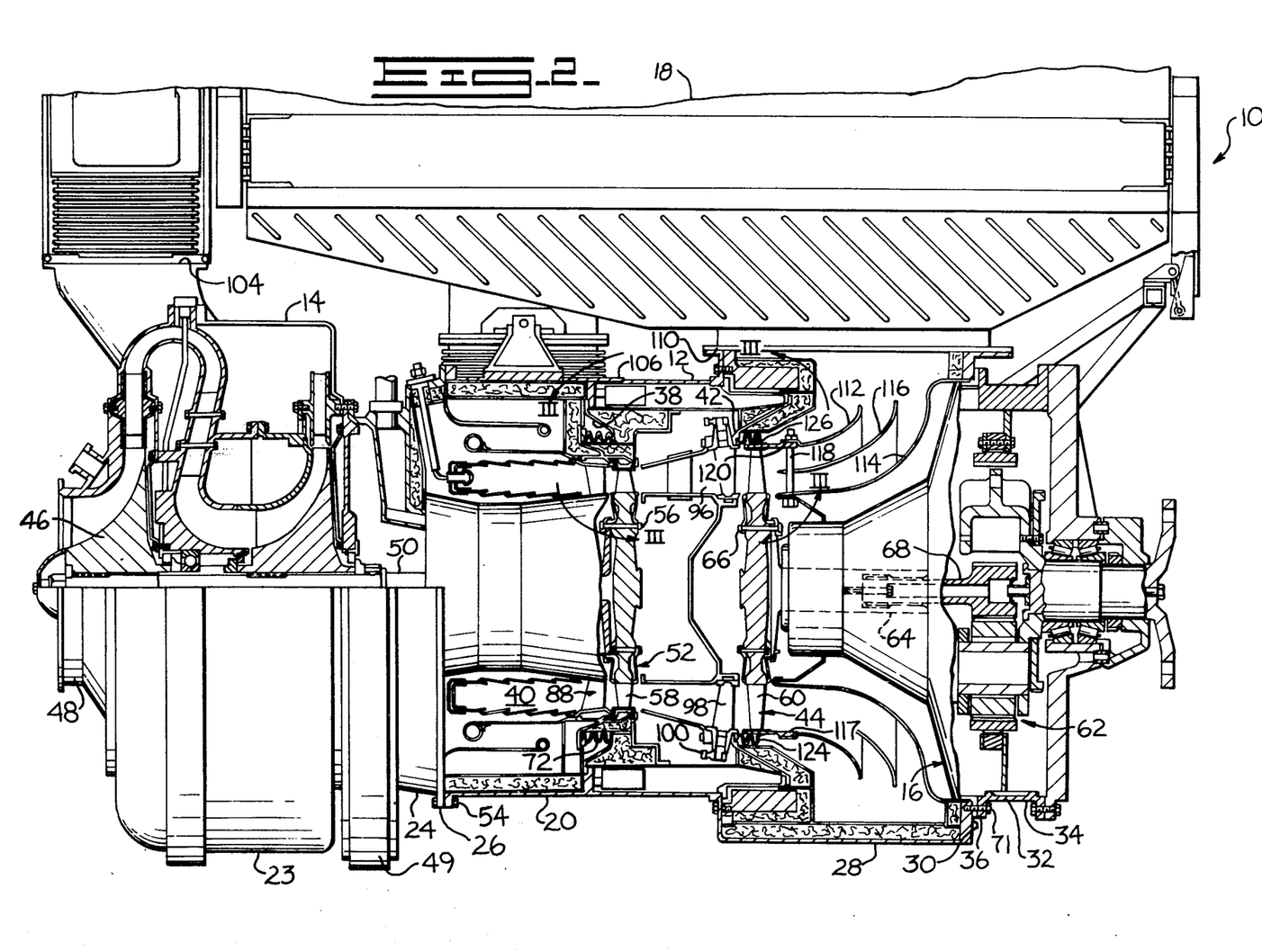
FIG. 2 illustrates in side elevational view, partially in section, the modular gas turbine assembly of FIG. 1 utilizing the turbine shroud support assembly of the present invention.

A modular gas turbine assembly 10 is illustrated most completely in FIGS. 1 and 2. The assembly includes a case 12, a gasifier module 14, a power output module 16 and a heat exchanger 18.

The case 12 is generally tubular in shape as will be most apparent from reference to FIG. 1. The case includes adjacent a first end 20 thereof a first flange 22 which is adapted for attachment to a compressor collector in the form of a first tubular housing 23 of the gasifier module 14 adjacent a first end 24 of said first housing as by attachment to a first flange 26 adjacent said first end of the gasifier module. Adjacent a second end 28 of the case there is provided a second flange 30 extending inwardly. The second flange 30 of the case is fixedly detachably attachable adjacent a first end 34 of the second housing via a flange 36 extending outwardly adjacent said first end 34 of the second housing 32. Mounting means 37 extend from the exterior of the case 12 for mounting said case to a frame. This is extremely advantageous since it allows removal of either or both the gasifier module 14 and the power output module 16 from the case 12 without removal of the case 12 from whatever frame it is attached. This allows interchangeability of modules for repair of individual modules without complete removal of the assembly from it's use situation. Also, since the modules are removed axially from the case 12 for example, generally, on dolly supported platforms or the like there is no need for lifting equipment although of course the use of some tackle may be desirable because of the weight of the modules. In the embodiment illustrated, a detachably attachable first flange means 38 extends inwardly within the case generally towards a combustor 40 of the gasifier module. Second means, in the embodiment illustrated a detachably attachable second flange means 42 extends inwardly in the case generally towards a power turbine portion 44 of the power output module 16. The purpose of the flange means 38 and 42 will becme apparent in following.

The gasifier module 14 includes the first tubular housing 23 fixedly detachably attachable as previously explained with the first end 24 thereof adjacent the first end 20 of the case 12. Generally, the axis of the first housing is aligned generally with the axis of the case. A compressor 46 forms a part of the gasifier module and is located generally within a second end 48 of the first housing 23. The previously mentioned combustor 40 generally extends outwardly from the first end 24 of the first housing 23. The assembly 10 preferably includes as part of said gasifier module an auxiliary gear box 49 intermediate the compressor 46 and the combustor 40, said auxiliary gear box 49 being driven by a first shaft 50. The first shaft 50 extends from the compressor 46 to adjacent the combustor 40. The first shaft 50 is removable along with the rest of the gasifier module and generally along with a gasifier turbine 52 from the case 12. Removal of the gasifier module from the case can be accomplished by simply removing the bolt/nut combinations 54 which fasten together the first flange 22 of the case to the first flange 26 of the gasifier module. The gasifier turbine 52 is removably attachable to the first shaft 50 as by removing the bolt means 56. This provides easy access to the combustor 40 which is the portion of the assembly 10 which is most likely to need repair and maintenance. The gasifier module 52 includes first blades 58 positioned to be in the path of exhaust gases exiting the combustor 40. The first blades 58 then serve to turn the gasifier turbine 52 and thereby to drive the first shaft 50, which then drives the compressor 46. A starting motor (not illustrated) is used to drive the compressor 46 on start up, i.e., when the gasifier turbine 52 is not being turned at a high enough speed by the combustion gases exiting the combustor 40 to provide sufficient compression within the compressor 46.

The power output module 16 as previously stated includes the second housing 32 which is fixedly detachably attachable with the first end thereof 34 adjacent the second end 28 of the case 12. The power output module is detachably attachable to the case 12 with the axis of the second housing 32 aligned generally with the axis of the case. The power turbine 44 extends generally outwardly from the first end 34 of the second housing 32. The power turbine has a plurality of second blades 60 positioned to be in the path of exhaust gases exiting the gasifier turbine 52. More particularly the second blades 60 are positioned to receive the flow of exhaust gases from the first blades 58. The power output module further includes output gear means illustrated generally at 62 for taking power from a second shaft 64 which is driven by the power turbine 44. For ease in repair and maintenance the power turbine 44 is generally detachably attachable as via the bolting means 66 to the second (power output module) shaft 64. Also, for ease in servicing an extension 68 of the second shaft 64, said extension is detachably attached to said second shaft. The extension serves to transfer power to the output gear means 62. Attachment of the second flange 30 of the case 12 to the flange 36 of the second housing 32 is generally accomplished via the bolts 71.

Figure 3:
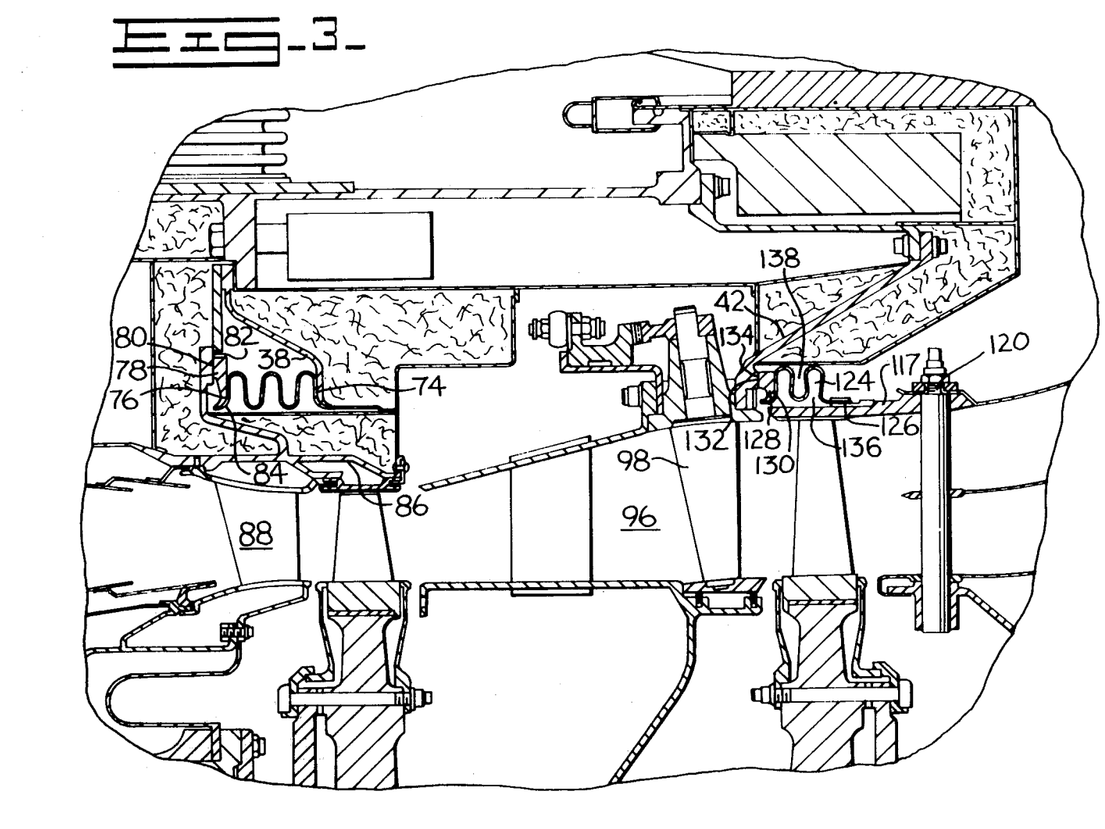
FIG. 3 illustrates in partial view, partially in section, area III—III of FIG. 2.

First slidable sealing means, in the embodiment illustrated in FIGS. 2 and 3, a first slidable bellows 72 slidably seals the gasifier module 14 to the case 12. The bellows 72 is affixed as by welding or the like to the first flange means 38 at one end 74 of said bellows 72, a second end 76 of the first bellows 72 being attached as by welding or the like to a ring 78 having a relatively large flat face 80 which slidably fits against a flat annular surface 84 supported by an outer ring 86 of a turbine nozzle vane assembly 88 which forms a part of the gasifier module 14 and is attached to direct flow of exhaust gases from the combustor 40 to the first blades 58 of the gasifier turbine 52. Thus, the first slidable sealing means, in this case the first bellows 72 sealingly extends between the nozzle vane assembly 88 and the first flange means 38. It is clear that a similar result is obtainable if the first bellows 72 is fixedly attached to the bracket 84 and slidably attached at the one end 74 of said first bellows 72 and the first flange means 38. As will be noted by reference to FIGS. 2 and 3, a cross-section of the first bellows comprises a plurality of loops. It is clear that alignment of the flat face 80 with the flat surface 82 is automatic with fastening of the first flange 22 of the case 12 to the first flange 26 of the first housing 23.

The case 12 includes annular channel means 96 which serve as a duct to direct flow to the power turbine 44 extending interiorly from the case 12 intermediate the first detachably attachable flange means 38 and the second detachably attachable flange means 42. The annular channel means 96 directs exhaust gases from the first blades 58 to the second blades 60. Having the annular channel means 96 be a part of the case 12 is an advantage; for example, the combustor 40 is easily available for service and like when the gasifier module 14 is removed from the case 12. Similarly the interior parts of the power output module 16 are easily available with minimum disassembly when the power output module 16 is removed from the case 12. The annular channel means 96 preferably includes a plurality of fixedly adjustable vanes 98 for adjusting the flow of the hot combustion gases through the second blades 60. Fixable adjustment of the vanes 98 is accomplished through use of a plurality of gear segments 100.

The assembly 10, as previously mentioned, includes in a preferred embodiment the heat exchanger 18. As will be noted most particularly by reference to FIGS. 1 and 2 the heat exchanger 18 is attached to receive compressed gas from the compressor 46 via the flanged port 104, to heat the compressed gas therein and to pass the resulting heated compressed gas to the combustor 40 via the flanged entry 106 in the case 12. Likewise, the heat exchanger 18 receives the exhaust gases from the power turbine 44, cools the exhaust gases therein by transferring some of the heat thereof to the compressed gas and passes the resulting cooled exhaust gases to the exterior of the heat exchanger via the exit 108. To maximize the efficiency of the assembly it is important that the exhaust gases be passed to the heat exchanger 18 with as little pressure loss due to turbulence developed therein as is reasonably possible. In the embodiment of the invention illustrated this is accomplished by passing the exhaust gases into the flanged opening 110 of the heat exchanger 18. To assure that the flow into the heat exchanger 18 from the power turbine 44 is as smooth as possible the gases are guided between an outer shroud 112 and an inner shroud 114. A baffle 116 may be provided between the outer shroud 112 and the inner shroud 114 if so desired to aid in maintaining the flow as smooth as possible. The shapes of the outer shroud 112 the inner shroud 114 and the baffle 116 are designed according to well known fluid dynamic principles so as to minimize pressure losses due to turbulence.

To accomplish the proper positioning of a power turbine shroud 117, from which outer shroud 112 proceeds, relative to the power turbine 44 a plurality of struts 118 are provided supported by the power output module 16. The struts 118 extend radially outwardly adjacent the power turbine 44. The struts support at an outer end 120 thereof the power turbine shroud 117 which is positioned to provide the proper blade tip clearance. The outer shroud 112 and the inner shroud 114 direct flow from the power turbine shroud 117 of the power turbine 44 to the heat exchanger 18. The inner shroud 114 as will be noted from FIG. 2 is generally parallel to the outer shroud 112 for the aforementioned reason of reducing turbulence and concurrent power losses. The struts 118 also serve a second purpose. In particular, a second slidable sealing means for sealing the power output module 16 adjacent the power turbine 44 to the second flange means 42 is supported by said struts 118 and more particularly by the outer end 120 thereof. Thus, the second slidable sealing means extends between the outer end 120 of the struts 118 and the second flange means 42. Also, in the embodiment illustrated the second slidable sealing means, which in the embodiment shown in FIGS. 2 and 3 comprises a second bellows 124, extends between the power turbine shroud 117 and the second flange means 42. The second bellows 124 in the embodiment illustrated is fixedly attached at a first end 126 thereof to a respective one of the power turbine shroud 117 and the second flange means 42. A second annular seal 128 is fixedly attached to a second end 130 of the second bellows 124. The second annular seal 128 slidably sealingly contacts a respective other of the power turbine shroud 117 and the second annular seal 128. In the particular embodiment illustrated a flat face 132 of the second annular seal 128 fits slidingly against a falt annular surface 134 of said second flange means 42. It will be noted that no matter what the degree of alignment is of the power turbine with respect to the alignment of the annular channel means 96, i.e., with respect to the alignment of the case 12, within reasonable limits, the power turbine shroud 117 is invariably aligned so as to provide proper clearance for the second blades 60.

In the embodiment illustrated in FIGS. 2 and 3 the second bellows 124 comprises a plurality of loops and said second bellows 124 includes more of said loops opening towards a high pressure side 136 thereof than opening towards a low pressure side 138 thereof. This helps to provide added force acting against the second annular seal 128 to impel it towards the annular surface 134 as the assembly 10 operates and pressure differentials arise therewithin. A similar construction can be used with the first bellows 72, space permitting. As will be most apparent from examination of FIGS. 2 and 3, the high pressure side 136 of the second bellows 124 is exposed to pressure from the exhaust gases adjacent the power turbine 44 and the low pressure side 138 of the second bellows 124 is exposed to pressure from the exhaust gases after expansion via the inner and outer shrouds 114 and 112.

Figure 4:
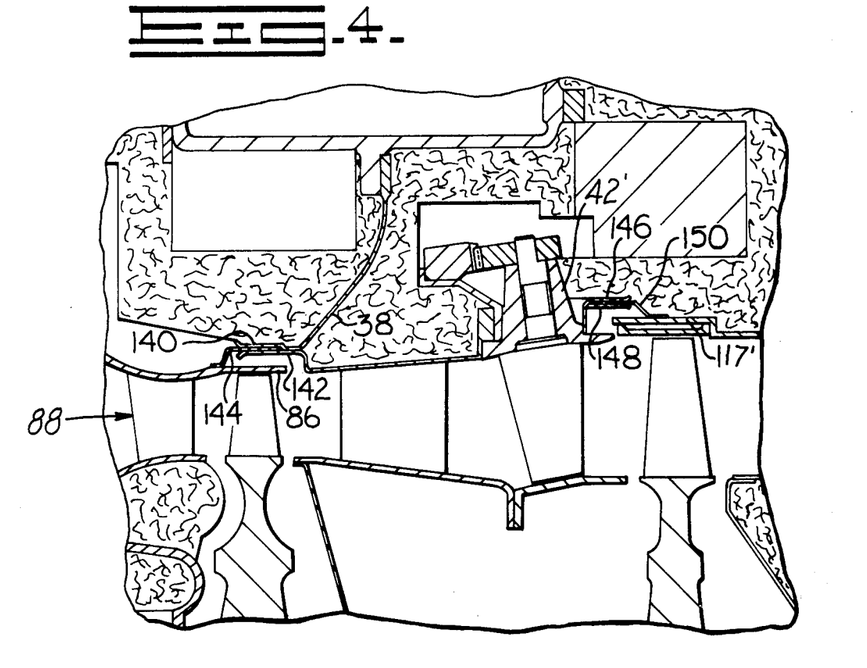
FIG. 4 illustrates in partial view, partially in section, an alternate embodiment of a sealing means useful in the modular gas turbine engine assembly.

Referring now specifically to FIG. 4 there is illustrated therein a first alternate embodiment of the engine namely an embodiment wherein the first slidable sealing means comprises a first annular fish mouth 140 fixedly attached at a base 142 thereof to a respective one of the turbine nozzle vane assembly 88 and the first extending means, namely the first flange means 38. The first slidable sealing means further comprises, in the embodiment illustrated in FIG. 4, a first annular tongue 144 for slidably fitting in said first annular fish mouth 140 said first annular tongue being fixedly attached to a respective other of said turbine nozzle vane assembly 88 and said first flange means 38. It is preferred that the first annular fish mouth 140 be fixedly attached at the base 142 to the first flange means 38 as illustrated and the first annular tongue 144 be fixedly attached to the turbine nozzle vane assembly 88.

In the embodiment illustrated in FIG. 4 the second slidable sealing means comprises a second annular fish mouth 146 fixedly attached at a base 148 thereof to a respective one of the power turbine shroud 117 and the second extending means, namely the second flange means 42. The second slidable sealing means also comprises a second annular fish mouth 146, said second annular tongue 150 being fixedly attached to a respective other of said power turbine shroud 117 and said second flange means 42. In the preferred embodiment as illustrated in FIG. 4 the second annular fish mouth 146 is fixedly attached to the second flange means 42 and the second annular tongue 150 is fixedly attached to the power turbine shroud 117.

Because of the flexibility of the first annular fish mouth 140 and the second annular fish mouth 146 as well as the flexibility of the first annular tongue 144 and the second annular tongue 150 alignment of the first annular tongue 144 to fit within the first annular fish mouth 140 and of the second annular tongue 150 to fit within the second annular fish mouth 146 provides ease of assembly.

Figure 5:
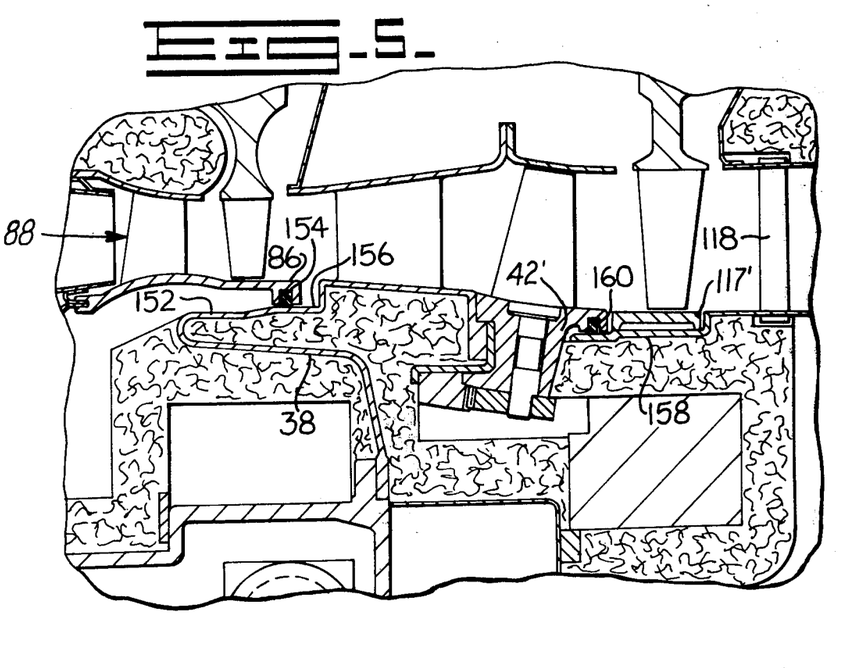
FIG. 5 illustrates in partial view, partially in section, yet another embodiment of the sealing means.

Referring now to FIG. 5 there is illustrated a second alternate embodiment of the engine, namely an embodiment wherein the first annular slidable sealing means comprises a first shroud 152 fixedly attached to a respective one of the turbine nozzle vane assembly 88 and the first flange means 38. The first annular slidable sealing means further comprises in this embodiment a first ring seal 154 for slidably fitting against a surface 156 of the first shroud 152, the first ring seal 154 being fixedly attached to a respective other of said turbine nozzle vane assembly 88 and said first flange means 38. As illustrated in FIG. 5, the most preferred embodiment is wherein the first shroud 152 is fixedly attached to the turbine nozzle vane assembly 88 and the first ring seal 154 is fixedly attached to the first flange means 38.

In the embodiment as illustrated in FIG. 5, the second slidable sealing means comprises a second shroud 158 fixedly proceeding from a respective one of said power turbine shroud 117' and said second flange means 42' and a second ring seal 160 for slidably fitting against a surface of said second shroud 158, said second seal proceeding from a respective other of said power turbine shroud 117' and said second flange 42'. In the embodiment as illustrated in FIG. 5 and as is preferred, the second piston 158 proceeds from the power turbine shroud 117' and the second ring seal 160 proceeds from the second flange means 42'.

It will be further obvious that it is possible to use as one of said first and second slidable sealing means one of said bellows, said fish mouth, and said ring seal and to use as the other of said first and second sealing means a different one of said bellows, said fish mouth and said ring seal. It will be further obvious that the other circular seals can also be used within the contemplation of the invention.

Figure 6:
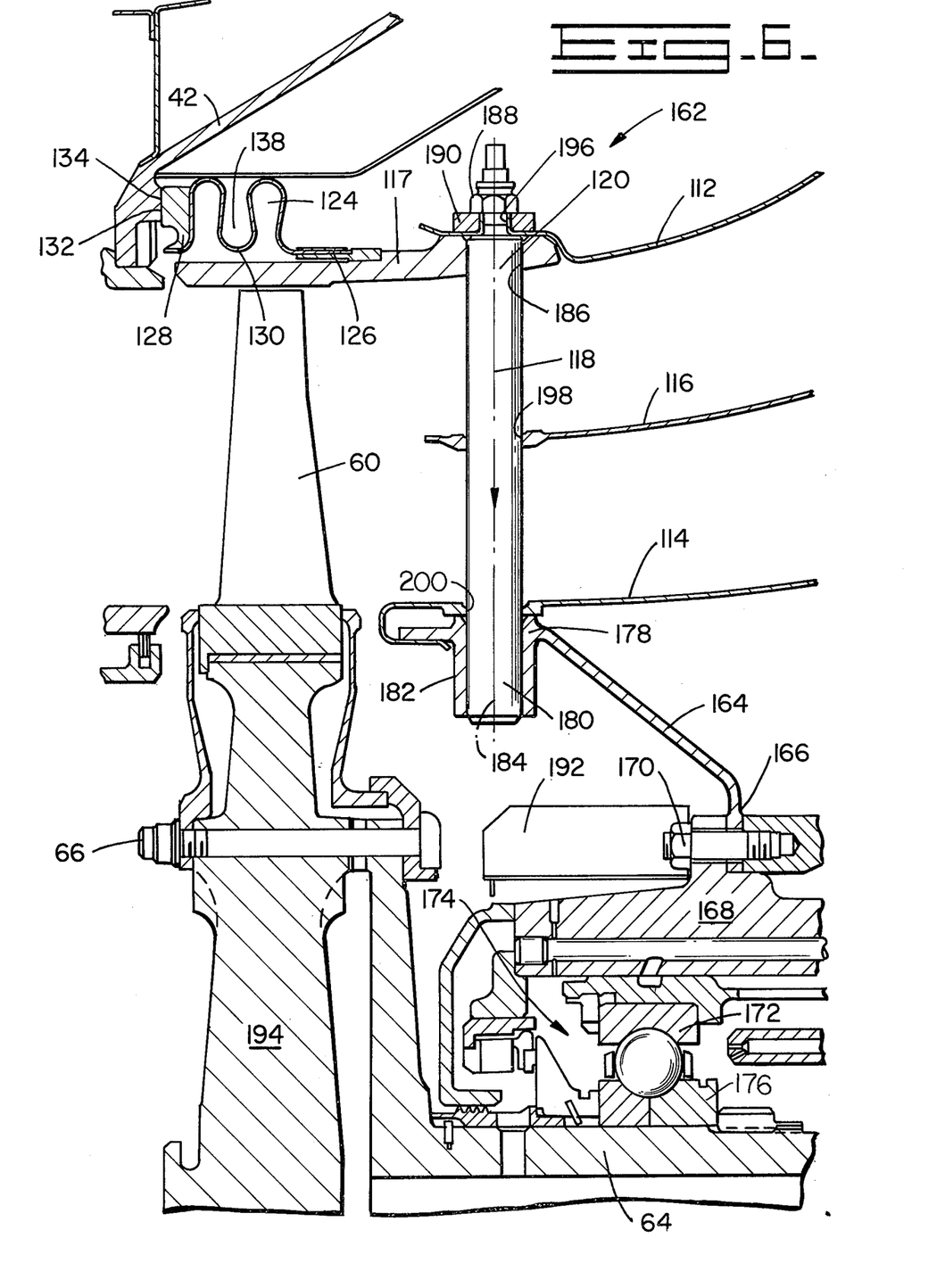
FIG. 6 illustrates in partial blown up view, partially in section, the turbine shroud support assembly of the present invention.

Turning now most particularly to FIG. 6, there is illustrated therein in considerable detail an improved shroud support assembly 162 of the present invention. The improved turbine shroud assembly includes the plurality of struts 118 supported by the power output module 16. More particularly, the struts 118 are each supported by an inner support fixture 164 which is piloted adjacent a first portion 166 thereof to a stationary bearing carrier 168 as via bolting means 170. The bearing carrier 168 surrounds and supports an outer race 172 of a bearing 174. An inner race 176 of the bearing 174 contacts the second (power turbine) shaft 64. A second portion 178 of the inner support fixture 164 is spaced from the bearing carrier 168. The second portion 178 of the inner support fixture 164 supportingly positions a second end 180 of each respective one of the struts 118. In the preferred embodiment as illustrated in FIG. 6 the second portion 178 of the inner support fixture 164 comprises a plurality of sleeves 182 each haivng an axis 184 extending generally along a radius extending from an axis of the second shaft 64. The second end 180 of each of the struts 118 fits in tight but slidable relation within a respective one of the sleeves 182. The turbine shroud 162 includes a plurality of holes 186, one of which is illustrated in FIG. 6, leading therethrough in one to one relation with the plurality of struts 118. Each of the struts 118 fits within a respective one of the holes 186 in tight but slidable relation. A plurality of nut means such as a plurality of nuts 188 used in combination with a plurality of washers 190 in one to one relation with the plurality of struts 118 serves to fasten the turbine shroud 117 to the struts 118. On removal of the nuts 188 and the washers 190 each of the struts 118 is movable generally radially inwardly towards the second shaft 64 with the struts 118 being slidable within the sleeves 182. In this manner, the struts 118 are movable out of the holes 186 and in fact are movable generally radially until they touch against one of a plurality of bosses 192 which extend from the bearing carrier 168. It is clear that when the respective nuts 188 and washers 190 are removed and the struts 118 are moved generally radially inwardly towards or against the bosses 192 then the turbine shroud 117 is removable without removal of a turbine rotor 194 from which the turbine blade 60 extend, which turbine rotor 194 is driven by the second or turbine shaft 64. it is clear also that the outer shroud 112 has a second plurality of holes 196 therein through which the struts 118 pass and that when the struts 118 are moved radially inwardly towards the shaft 64 that the outer shroud 112 can likewise be removed from the power output module 16.

Generally, the baffle 116 will be in tight but slidable fit about the struts 118 at a third plurality of holes 198 which pass through the baffle 116. Yet further, the inner shroud 114 will be in tight but slidable relation with the struts 118 at a fourth plurality of holes 200. If one desires to change the baffle 116 this can be accomplished by removing the turbine shroud 117 and the outer shroud 112 as previously discussed and then the struts 118 can be removed as can the turbine rotor 194 through use of the holding means 66 and then the baffle 116 can be removed, leftwardly in FIG. 6, from the power output module 16. The inner shroud 114 can be removed in a like manner to the baffle 116.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. In a gas turbine engine which comprises a gasifier module within a case, a power output module fixedly attachable to said case in position to receive exhaust gases exiting a combustor and passing via a gasifier turbine portion of said gasifier module to drive a power turbine having a turbine shroud about a plurality of blades of said turbine and thereby to drive a shaft of said power output module an improved turbine shroud support assembly, comprising;

a plurality of struts radially extending outwardly adjacent said power turbine, said struts supporting at a plurality of outer ends thereof said turbine shroud in fixed closely spaced concentric relation about said plurality of turbine blades, said struts supporting at said outer ends thereof an outer shroud which is positioned to direct the flow of said exhaust gases away from said blades of said power turbine;

a stationary bearing carrier surrounding and supporting an outer race of a bearing, an inner race of said bearing contacting said power turbine shaft;

inner support means fixed to said bearing carrier;

a plurality of sleeves, each having an axis generally radially extending from said shaft supported by said inner support means, said inner ends of each of said struts fitting in tight but slidable relation within a respective one of said sleeves, said turbine shroud including a plurality of holes therethrough in one-to-one relation with said plurality of struts, each of said struts fitting in a respective one of said holes in tight but slidable relation; and a plurality of fastening means in one-to-one relation with said plurality of struts, each of said fastening means fastening said turbine shroud to a respective one of said struts, each of said struts being movable radially inwardly toward said shaft and out of the respective holes when the respective fastening means is detached to allow removal of said turbine shroud without removal of a turbine rotor which supports said blades and is driven by said shaft.

2. In a gas turbine engine which comprises a gasifier module within a case, a power output module fixedly detachably attachable to said case in position to receive exhaust gases exiting a combustor and passing via a gasifier turbine portion of said gasifier module to drive a power turbine having a turbine shroud about a plurality of blades of said turbine and thereby to drive a shaft of said power output module and a heat exchanger arranged to receive compressed gas from a compressor of said gasifier module, heat the compressed gas therein and pass the resulting heated gas to said combustor and to receive said exhaust gases from said power turbine, cool said exhaust gases therein by transferring some of the heat thereof to said compressed gas and pass the resulting cooled exhaust gases to the exterior of said heat exchanger, an improved turbine shroud support assembly, comprising:

a plurality of struts supported by said power output module in fixed relation to said power turbine shaft and radially extending outwardly adjacent said power turbine, said struts supporting at a plurality of outer ends thereof said turbine shroud in fixed closely spaced concentric relation about said plurality of turbine blades, said struts supporting at said outer ends thereof an outer shroud which is positioned to direct flow of said exhaust gases from said blades of said power turbine to said heat echanger;

an inner support piloted against a first portion thereof to a stationary bearing carrier which surrounds and supports an outer race of a bearing, an inner race of said bearing contacting said power turbine shaft, said inner support having a second portion thereof spaced from said bearing carrier, said second portion supportingly positioning an inner end of each respective one of said struts, said second portion comprising a plurality of sleeves each having an axis generally along a radius extending from an axis of said shaft, said inner ends of each of said struts fitting in tight but slidable relation within a respective one of said sleeves, said turbine shroud including a plurality of holes therethrough in one to one relation with said plurality of struts, each of said struts fitting within a respective one of said holes in tight but slidable relation; and a plurality of nut means in one to one relation with said plurality of struts, each of said nut means fastening said turbine shroud to a respective one of said struts, each of said struts being movable radially inwardly toward said shaft and out of the respective hole when the respective nut means is removed to allow removal of said turbine shroud without removal of a turbine rotor which supports said blades and is driven by said shaft.

3. An improved assembly as in claim 1, including an inner shroud supported at the inner end of said struts generally parallel to said outer shroud, said inner and outer shrouds being shaped to reduced pressure losses due to a turbulence in the flow of said exhaust gases from said power turbine to said heat exchanger.

4. An improved assembly as in claim 1, wherein said power output module includes slidable sealing means extending from said turbine shroud and means extending inwardly from said case to contact said slidable sealing means.

5. An improved assembly as in claim 1, wherein said slidable sealing means comprises a bellows fixedly attached at a first end thereof to said turbine shroud and an annular seal fixedly attached to a second end of said bellows and slidingly sealingly contacting said inward extending means.

6. An improved assembly as in claim 1, wherein said power output module is fixedly detachably attachable to said case and wherein said engine includes a heat exchanger arranged to receive compressed gas from a compressor of said gasifier module, heat the compressed gas therein and pass the resulting heated gas to said combustor and to receive said exhaust gases from said power turbine, cool said exhaust gases therein by transferring some of the heat thereof to said compressed gas and pass the resulting cooled exhaust gases to the exterior of said heat exchanger.

7. An improved assembly as in claim 6, wherein said inner support means comprises an inner support piloted adjacent a first portion thereof to said stationary bearing carrier, said inner support having a second portion thereof spaced from said bearing carrier, said second portion serving to supportingly position said inner ends of each respective one of said struts.

* * * * *